US009914369B2

United States Patent
Smuk et al.

(10) Patent No.: US 9,914,369 B2
(45) Date of Patent: Mar. 13, 2018

(54) VEHICLE SEAT WITH HOOK AND CAM LATCHING MECHANISM

(71) Applicant: Faurecia Automotive Seating, LLC, Auburn Hills, MI (US)

(72) Inventors: Wojciech Smuk, Troy, MI (US); Boris Biletskiy, West Bloomfield, MI (US); Thomas J. Cooley, Lapeer, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 15 days.

(21) Appl. No.: 14/869,380

(22) Filed: Sep. 29, 2015

(65) Prior Publication Data

US 2017/0088023 A1 Mar. 30, 2017

(51) Int. Cl.
*B60N 2/015* (2006.01)
*B60N 2/07* (2006.01)
*B60N 2/12* (2006.01)
*B60N 2/36* (2006.01)
*B60N 2/44* (2006.01)

(52) U.S. Cl.
CPC ....... *B60N 2/01583* (2013.01); *B60N 2/0732* (2013.01); *B60N 2/12* (2013.01); *B60N 2/366* (2013.01); *B60N 2002/4455* (2013.01); *B60N 2205/30* (2013.01)

(58) Field of Classification Search
USPC .................................................. 297/378.13
See application file for complete search history.

(56) References Cited

U.S. PATENT DOCUMENTS

| 4,765,682 | A | * | 8/1988 | Satoh | B60N 2/366 297/378.13 |
| 5,566,431 | A | * | 10/1996 | Haglund | A44B 11/2526 24/633 |
| 5,810,444 | A | * | 9/1998 | Refior | B60N 2/20 297/378.12 |
| 6,012,747 | A | * | 1/2000 | Takamura | B60N 2/366 292/210 |
| 6,022,166 | A | * | 2/2000 | Rogers, Jr. | B60N 2/01583 248/503.1 |
| 6,123,379 | A | * | 9/2000 | Yamada | B60N 2/01583 296/65.03 |
| 6,547,302 | B1 | * | 4/2003 | Rubio | B60N 2/366 296/65.09 |

(Continued)

FOREIGN PATENT DOCUMENTS

EP 0901426 B1 * 5/2000 ............. B60N 2/366

*Primary Examiner* — David E Allred
(74) *Attorney, Agent, or Firm* — Reising Ethington P.C.

(57) ABSTRACT

A vehicle seat includes a hook and cam latching mechanism that releasably couples an occupant support to the vehicle body. The latching mechanism has a hook and a cam that apply clamp loads at opposite sides of an anchor to lock the occupant support in a use position in a manner that can reduce or eliminate loose conditions and associated noise often associated with other types of latching mechanisms. Cam movement is coordinated with hook movement to accommodate an engaged condition with a secured clamp load along with easy engagement and disengagement of the hook. The latching mechanism can be used with easy-entry vehicle seats or other types of vehicle seats where movement of a seat bottom or seat back away from the vehicle body is desired.

24 Claims, 7 Drawing Sheets

(56) References Cited

U.S. PATENT DOCUMENTS

| | | | | |
|---|---|---|---|---|
| 6,733,078 B1* | 5/2004 | Zelmanov | B60N 2/2245 | 292/201 |
| 7,044,552 B2* | 5/2006 | Muller | B60N 2/01583 | 296/65.03 |
| 7,152,926 B2* | 12/2006 | Wrobel | B60N 2/01541 | 296/65.03 |
| 7,156,461 B2* | 1/2007 | Bolte | B60N 2/2245 | 296/65.13 |
| 7,188,906 B2* | 3/2007 | Christoffel | B60N 2/01583 | 297/336 |
| 7,325,874 B2* | 2/2008 | Zhang | B60N 2/01583 | 297/336 |
| 7,338,128 B2* | 3/2008 | Inoue | B60N 2/3009 | 297/378.13 |
| 7,367,604 B2* | 5/2008 | Miller | B60N 2/01583 | 248/503.1 |
| 7,404,605 B2* | 7/2008 | Inoue | B60N 2/224 | 296/65.16 |
| 7,416,254 B2* | 8/2008 | Jennings | B60N 2/366 | 297/378.12 |
| 7,631,907 B2* | 12/2009 | Sato | B60N 2/01583 | 292/216 |
| 7,703,828 B2* | 4/2010 | O'Connor | B60N 2/01583 | 296/65.01 |
| 7,762,605 B2* | 7/2010 | Otsuka | B60N 2/01583 | 248/503.1 |
| 7,954,898 B2* | 6/2011 | Van De Geer | B60N 2/01583 | 292/200 |
| 8,118,342 B2* | 2/2012 | Kokubo | B60N 2/2245 | 296/65.16 |
| 8,128,135 B2* | 3/2012 | Maeta | B60N 2/01583 | 292/201 |
| 8,186,753 B2* | 5/2012 | Fujisawa | B60N 2/01583 | 297/15 |
| 8,342,605 B2* | 1/2013 | Tanaka | B60N 2/366 | 297/216.1 |
| 8,590,973 B2* | 11/2013 | Matsuura | B60N 2/366 | 292/216 |
| 8,727,443 B2* | 5/2014 | Vedder | B60N 2/366 | 297/335 |
| 8,757,678 B2* | 6/2014 | Heeg | B60N 2/0232 | 292/201 |
| 8,783,753 B2* | 7/2014 | Ito | B60N 2/0155 | 296/65.09 |
| 8,894,153 B2* | 11/2014 | Ohba | B60N 2/2352 | 296/65.03 |
| 8,926,019 B2* | 1/2015 | Lee | B60N 2/2245 | 297/376 |
| 8,950,810 B2* | 2/2015 | Dryburgh | B60N 2/01583 | 297/336 |
| 9,039,089 B2* | 5/2015 | Ohba | B60N 2/2352 | 297/335 |
| 2004/0007909 A1* | 1/2004 | Bonk | B60N 2/366 | 297/378.13 |
| 2004/0021357 A1* | 2/2004 | Denning | B60N 2/3013 | 297/378.13 |
| 2004/0046434 A1* | 3/2004 | Zelmanov | B60N 2/366 | 297/378.13 |
| 2007/0200410 A1* | 8/2007 | Inoue | B60N 2/366 | 297/378.13 |
| 2007/0200411 A1* | 8/2007 | Inoue | B60N 2/366 | 297/378.13 |
| 2009/0033138 A1* | 2/2009 | Yamada | B60N 2/366 | 297/378.13 |
| 2010/0052394 A1* | 3/2010 | Heeg | B60N 2/366 | 297/378.13 |
| 2010/0102614 A1* | 4/2010 | Kreuels | B60N 2/01583 | 297/378.13 |
| 2011/0006576 A1* | 1/2011 | Muller | B60N 2/01583 | 297/378.13 |
| 2011/0012415 A1* | 1/2011 | Muller | B60N 2/01583 | 297/378.13 |
| 2013/0313395 A1* | 11/2013 | Blake | B60N 2/01583 | 248/503.1 |
| 2013/0328372 A1* | 12/2013 | Suzumura | B60N 2/366 | 297/378.13 |
| 2016/0009202 A1* | 1/2016 | Pejathaya | B60N 2/3011 | 297/378.13 |
| 2016/0152159 A1* | 6/2016 | Gordeenko | B60N 2/01583 | 297/378.13 |

\* cited by examiner

VEHICLE SEAT WITH HOOK AND CAM LATCHING MECHANISM

TECHNICAL FIELD

The present disclosure relates to a vehicle seat and, in particular, to a vehicle seat having a latching mechanism that releasably attaches part of the vehicle seat to an underlying vehicle structure.

BACKGROUND

A vehicle seat can be configured so that all or part of the seat is moveable away from a normal use position to increase vehicle utility and/or improve access to additional vehicle seating or cargo areas. For instance, some vehicle seats include a seat back that tilts forward to improve ingress and egress for passengers seated behind such vehicle seats. Other vehicle seats include a seat back that folds flat to increase cargo space. Still other vehicle seats are configured to be either partly or entirely removed from the vehicle. Releasable attachment of vehicle seat components to other components can present challenges with respect to ease of release and/or reattachment when balanced with other variables such as the strength, robustness, or stability of the attachment.

SUMMARY

In accordance with one or more embodiments, a vehicle seat includes a seat base adapted for mounting to a vehicle body, an occupant support supported by the seat base and having a use position, and a latching mechanism that releasably couples the occupant support to the vehicle body. The latching mechanism includes a hook, a cam, and an anchor. The latching mechanism has an engaged condition and a released condition. Movement of the occupant support away from the use position is prevented in the engaged condition, and movement of the occupant support away from the use position is allowed in the released condition. When the latching mechanism is in the engaged condition, the hook and the cam apply respective clamp loads in opposite directions at opposite sides of the anchor. When the latching mechanism is in the engaged condition, the hook can prevent movement of the occupant support away from the use position, and the cam can be biased in a direction that increases the respective clamp loads. The occupant support can be a seat bottom or a seat back, for example.

In some embodiments, the hook and the cam are attached to the occupant support and move with the occupant support when the occupant support moves away from the use position, and the anchor is coupled with the vehicle body. In other embodiments, the anchor is attached to the occupant support and moves with the occupant support when the occupant support moves away from the use position, and the hook and cam are coupled with the vehicle body. In some cases, the occupant support is configured for pivotal movement between the use position and a tilted position about a seat pivot axis when the latching mechanism is in the released condition. In one example, the occupant support is a seat bottom and the seat base includes seat rails that accommodate sliding movement of the seat bottom with respect to the vehicle body, the anchor being attached to one of the seat rails and the hook and the cam being attached to the seat bottom. In another example, the occupant support is a seat back, the anchor being attached to the seat back and the hook and the cam being attached to the vehicle body. The seat pivot axis can be located at a first end of the occupant support, and the latching mechanism can be located at a second end of the occupant support. In one embodiment, the vehicle seat is an easy-entry vehicle seat, with the first end of a seat bottom being a forward end and the second end of the seat bottom being a rearward end. In another embodiment, the vehicle seat is an fold-flat vehicle seat, with the first end of a seat back being a lower end and the second end of the seat back being an upper end.

In various embodiments, the latching mechanism may include any compatible combination of one or more of the following features:

- the hook is pivotably mounted to a hook pivot for movement toward and away from a closed position about a hook pivot axis, where the hook is at and biased toward the closed position when the latching mechanism is in the engaged condition;
- the cam is pivotably mounted to a cam pivot for movement toward and away from a closed position about a cam pivot axis, where the cam is at and biased toward the closed position when the latching mechanism is in the engaged condition;
- the hook pivot axis and the cam pivot axis are a fixed distance apart during movement of the seat bottom away from the use position;
- the cam pivot axis is offset from the hook pivot axis;
- the cam pivot limits rotational movement of the hook about the hook pivot axis when the latching mechanism is in the released condition;
- an angular position of the cam is a function of an angular position of the hook and changes more than the angular position of the hook during movement of the hook toward and away from a closed position.
- a cam guide moves with the hook about a hook pivot axis during movement of the hook toward and away from the closed position;
- the cam has a guide surface that engages the cam guide to define the position of the cam with respect to the hook during at least a portion of the movement of the hook toward and away from the closed position;
- a cam spring applies forces to the cam and the cam guide in opposite rotational directions when the latching mechanism is in the engaged condition;
- a hook spring biases the hook in the same rotational direction as the cam and applies a spring force at the cam guide that is higher than the spring force applied to the cam guide by the cam spring;
- the anchor is a plate having a cutout formed through the thickness of the plate, with the hook extending from one side of the plate, through the cutout, to the other side of the plate when the latching mechanism is in the engaged condition;
- the anchor is a post, such as a round or oval bar with a central axis;
- during a transition from the released condition, in which a clamping surface of the hook is located on one side of the anchor, to the engaged condition, the hook moves away from a closed position while in contact with the anchor, then moves toward the closed position when the clamping surface of the hook reaches the other side of the anchor, and the cam does not contact the anchor during the transition until the hook is in the closed position;
- a cam guide is mounted to the hook, the cam includes a guide surface, the hook is biased toward the closed position while in contact with the anchor, and the cam guide and the guide surface are engaged during a portion of the transition from the released condition so that cam movement is a function of hook movement during said portion of the transition;

the guide surface is shaped to prevent the cam from contacting the anchor during said portion of the transition;

the cam guide and guide surface are disengaged when the latch is in the closed position condition; and a cam spring biases the cam toward a closed position of the cam and provides at least a portion of the clamp load applied to the anchor by the cam when the latching mechanism is in the engaged condition.

BRIEF DESCRIPTION OF THE DRAWINGS

Illustrative embodiments will hereinafter be described in conjunction with the appended drawings, wherein like designations denote like elements, and wherein.

DETAILED DESCRIPTION

The latching mechanism described herein can be included as part of a vehicle seat and configured to releasably lock a moveable portion of the vehicle seat to a base or other adjacent structure in a manner that reduces or eliminates looseness and associated noise that is sometimes present with other latching systems. The latching mechanism can also be configured with reduced engagement and/or disengagement efforts when compared to conventional latching systems.

Figure 1:
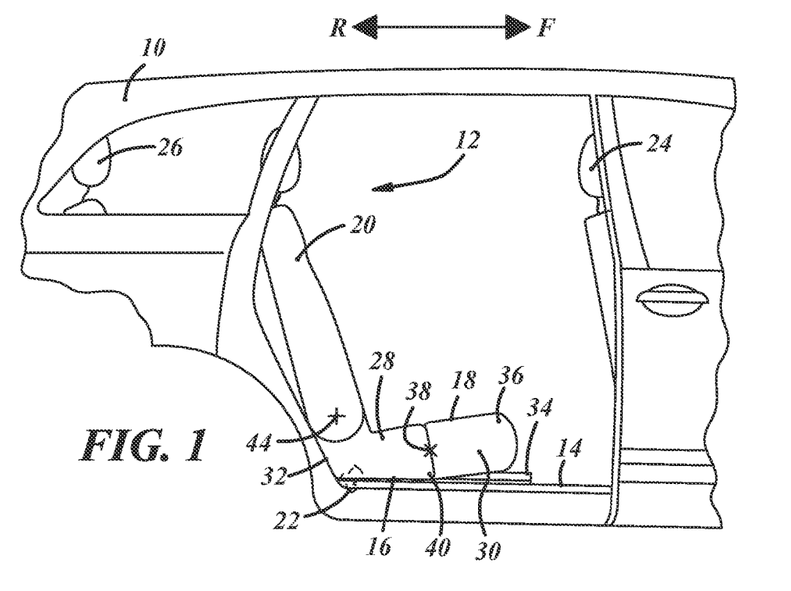
FIG. 1 is a side view of an example of an easy-entry vehicle seat that may include a latching mechanism with a seat bottom shown in a use position.

FIG. 1 is a partial side view of a vehicle 10 with a vehicle seat 12 mounted to a floor of a body 14 of the vehicle, with the forward (F) and rearward (R) vehicle directions indicated by the double arrow. The vehicle seat 12 includes a seat base 16 adapted for mounting to the vehicle floor 14, a first occupant support in the form of a seat bottom 18 supported by the seat base, a second occupant support in the form of a seat back 20 coupled with the seat bottom and thereby supported by the seat base, and a latching mechanism 22, the location of which is shown schematically in FIG. 1. In the example of FIG. 1, the latching mechanism 22 releasably couples the seat bottom 18 with the vehicle body via the seat base 16 with the seat bottom in a use position, which is the generally horizontal position shown in FIG. 1. When the latching mechanism 22 is in an engaged condition, movement of the seat bottom 18 away from the use position is prevented. When the latching mechanism 22 is in a released condition, movement of the seat bottom 18 away from the use position is allowed.

Figure 2:
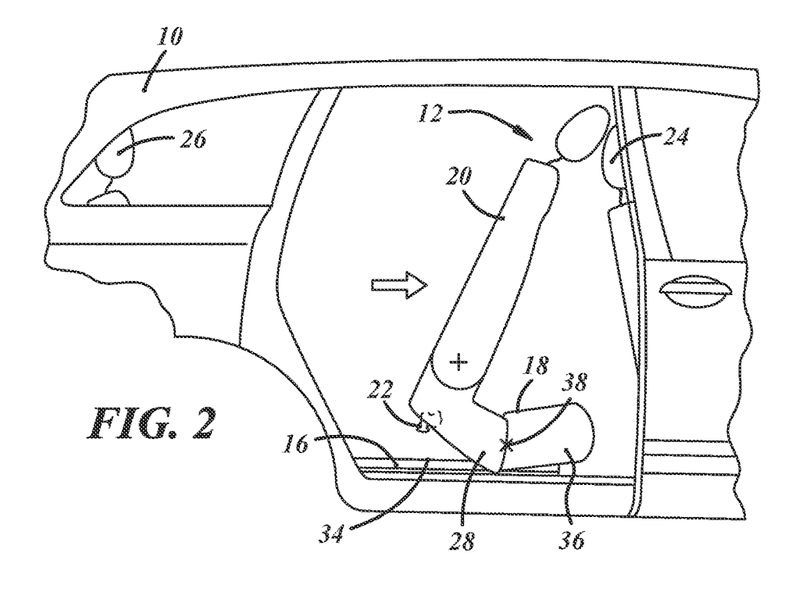
FIG. 2 is the view of FIG. 1 with the seat bottom shown in a tilted position.

The illustrated seat 12 is one example of an easy-entry seat and is installed in the vehicle 10 as a second row seat at a location rearward of a front row seat 24 and forward of a third row seat 26. While the front row seat 24 and the second row seat 12 are accessible from outside the vehicle 10 via respective front and rear door openings, ingress and egress to the third row seat 26 is somewhat more limited with no dedicated vehicle door opening. As shown in FIG. 2, the illustrated easy-entry vehicle seat 12 is configured so that at least a portion of the seat tilts and slides forward to increase the amount of space between the rear of the rear door opening and the back of the second row seat to enhance passenger ingress and egress to the third row seat 26.

The particular easy-entry seat configuration illustrated in FIGS. 1 and 2 is described in greater detail by Rdzanek et al. in U.S. Patent Application Publication No. 2013/0200673. However, it should be noted that this is only one of many variations of vehicle seats that may be equipped with the latching mechanism 22 disclosed herein. The latching mechanism 22 can be used with other types of seats, including other types of easy-entry seats. In another example of an easy-entry vehicle seat, the entire seat bottom 18 may tilt up and forward rather than only a rear portion 28 of the seat bottom. Or a front end 30 of the seat bottom 18 may be releasably locked to the seat base 16 and tilt up toward a vertical position where it is aligned with the seat back 20. One such example is described in U.S. Pat. No. 9,114,732 to Cooley et al. Skilled artisans will recognize other easy-entry applications for the latching mechanism disclosed herein.

The latching mechanism 22 may also be used with fold-and-tumble vehicle seats, such as a vehicle seat where the seat back 20 folds down flat against the seat bottom 18 and a rear end 32 of the seat bottom is releasably locked to the seat base 16 by the latching mechanism. One non-limiting example of such a vehicle seat is described in U.S. Pat. No. 7,048,330 to Daniel. In other examples, the seat bottom 18 and/or the seat back 20 or some portion thereof can be releasably locked to the seat base 16 or directly to the vehicle body by the latching mechanism and completely detached from the vehicle floor 14 when the latching mechanism 22 is in the released condition. In yet another example, the latching mechanism 22 may be used with a fold-flat vehicle seat, such as a rear seat, where the seat back 20 folds down to a horizontal position flat against the seat bottom 18 from a generally vertical use position, with an upper end of the seat back being releasably locked to the vehicle body by the latching mechanism.

Referring again to FIGS. 1 and 2, the particularly illustrated seat base 16 is configured to accommodate sliding movement of the seat bottom 18 with respect to the vehicle body 14 and includes one or more seat rails 34. Easy-entry mechanisms that selectively allow and prevent such sliding movement are known and not described in detail here. The seat base 16 may typically include mounting features for attachment of the seat base and, thereby, the vehicle seat 12 to the floor of the vehicle body 14. The seat base 16 can also include other pivoting or sliding members that guide or control movement of the seat bottom 18 when moved toward or away from the use position of FIG. 1.

The illustrated seat bottom 18 includes separately moveable rear and front portions 28, 36. The seat bottom 18 is configured for pivotal movement about a seat pivot axis 38 between the use position of FIG. 1 and a tilted position (FIG. 2) when the latching mechanism 22 is in the released condition. Any position away from the use position with the latching mechanism not in the engaged condition is considered a tilted position. The seat pivot axis 38 is generally parallel with the vehicle floor and oriented in the transverse direction of the vehicle (side-to-side). The seat pivot axis 38 may be located at or along a first end 40 of the seat bottom 18 with the latching mechanism 22 located at or along a second end or rearward end 32 of the seat bottom, spaced longitudinally (front-to-back) along the vehicle from the first end. In this example, the first end 40 of the seat bottom 18 is a forward end of the seat bottom and, more particularly, the forward end of the rear portion 28 of the seat bottom. The second end 32 of the seat bottom 18 is the rearward end of the seat bottom and of the rear portion 28 of the seat bottom.

The illustrated seat back 20 is coupled with the seat bottom 18 and thereby supported by the seat base 16 and may be configured for pivotal movement about a seat back pivot axis 44 via a recliner mechanism and/or a fold-flat mechanism, for example. The seat back 20 is shown in an upright or use position in FIG. 1 and in a tilted position as moved together with the released seat bottom 18 in FIG. 2. In some cases, the seat back can assume a fold-flat position, in which it is tilted away from its use position and lying generally horizontal along the top of the seat bottom 18. The latching mechanism 22 can remain in the engaged condition with the seat bottom 18 in the use position while the seat back 20 is in the fold-flat position, and in some cases, the latching mechanism can be actuated to release the seat bottom from the seat base 16 in any position of the seat back 20.

Figure 3:
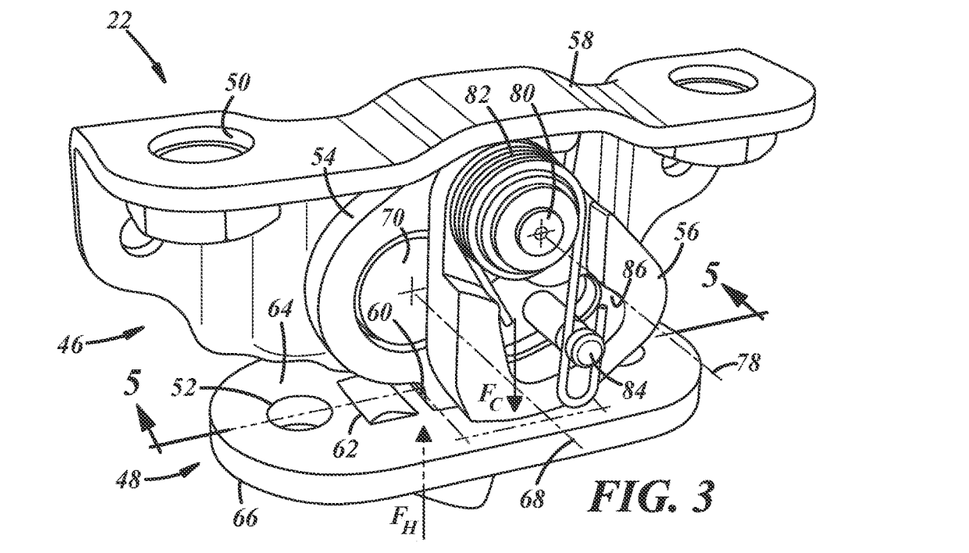
FIG. 3 is a perspective view of one side of an example of the latching mechanism.
Figure 4:
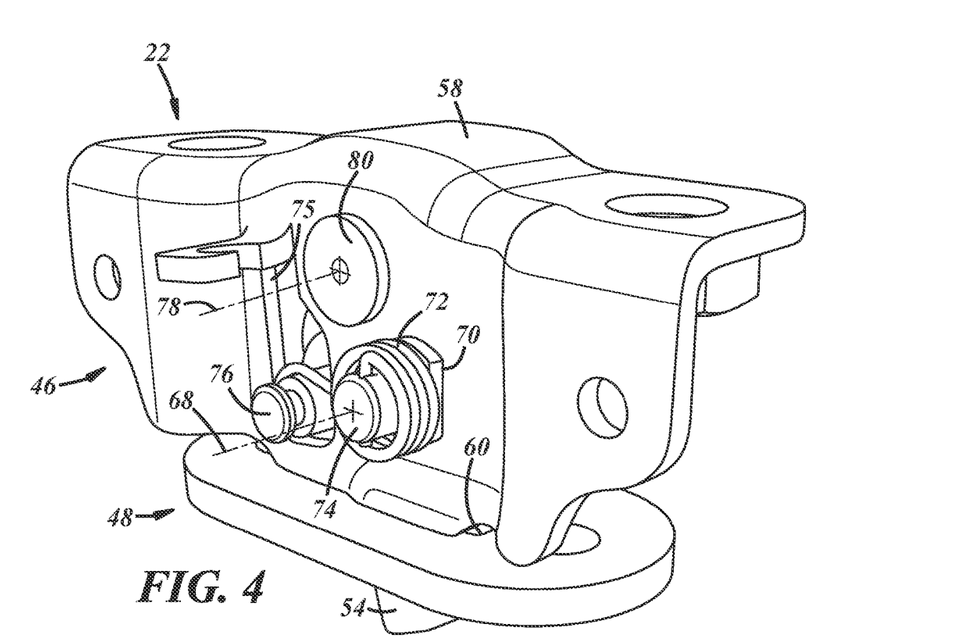
FIG. 4 is a perspective view of an opposite side of the latching mechanism of FIG. 3.

FIGS. 3 and 4 are perspective views of an embodiment of the latching mechanism 22 detached from the vehicle seat and shown in the engaged condition. The latching mechanism 22 includes a latch assembly 46 and an anchor 48. In this example, the latch assembly 46 is adapted for attachment to the occupant support—i.e., the seat bottom 18 or the seat back 20—via attachment features 50, and the anchor 48 is adapted for attachment to the seat base or to the vehicle body via attachment features 52. In one embodiment, the latch assembly 46 is attached to a frame or frame member of the seat bottom, and the anchor 48 is attached to the seat rail 34. In this example, the latch assembly 46 thus moves with the occupant support between the use position and the titled position, while the anchor remains at a fixed location relative to the seat base. In other examples, the latching mechanism 22 can be inverted, with the latch assembly in a fixed location with respect to the seat base or vehicle body and the anchor 48 in a fixed location with respect to the occupant support and thus moving with the occupant support between the use and tilted positions.

The illustrated latching mechanism 22 includes a hook 54 and a cam 56, each mounted to and supported by a bracket 58. The hook 54, cam 56, and bracket 58 are all provided as part of the latch assembly 46 in this example, but this is not necessary. For instance, either or both of the hook 54 and the cam 56 could be mounted directly to the occupant support, seat base, or vehicle body.

The illustrated anchor 48 is in the form of a latch plate with a cutout 60 formed through the thickness of the plate. The illustrated cutout 60 is an aperture defined completely within the bounds of the perimeter of the plate 48, but the cutout could be formed along and provide a portion of the perimeter of the plate 48. The particularly illustrated plate 48 includes a dimple 62 formed therein (e.g., by stamping) that can assist with hook 54 engagement. The convex side of the dimple 62 is visible in FIG. 3 at a first side 64 of the plate, and a concave side of the dimple (not visible in FIG. 3) at an opposite second side 66 of the plate. The convex side may be an artifact of manufacturing and otherwise unnecessary to assist with hook engagement. In other examples, the anchor 48 is not a plate. The anchor 48 could be a transversely oriented post, for example, or any other element with opposite first and second sides 64, 66 with which the hook 54 and cam 56 can engage. In a particular example, discussed and illustrated further below, the anchor 48 could be a round bar adapted for attachment to the vehicle body or to one of the occupant supports.

In this case, the hook 54 extends through the cutout 60 and from the first side 64 of the plate 48 to the second side 66 of the plate when the latching mechanism 22 is in the illustrated engaged condition. In the engaged condition, the hook 54 applies a hook clamp load $F_H$ at the second side 66 of the plate 48, and the cam 56 applies a cam clamp load $F_C$ at the first side 64 of the plate. Each of the illustrated clamp loads $F_H$, $F_C$ is the vertical component of the actual loads applied by the hook and cam, which may have components in other directions.

As apparent in FIG. 3, one of the characteristics of the illustrated latching mechanism 22 is that the anchor 48 is clamped or pinched between portions of the latch assembly 46 when in the engaged condition. The hook 54 functions to lock the latch assembly 46 to the anchor 48, and thereby the occupant support to the seat base or vehicle body, to prevent movement of the occupant support away from the use position, even in the absence of the cam 56. The cam 56 functions to apply the cam clamp load $F_C$ at the first side 64 of the plate 48 and thereby tighten the hook (i.e., increase the hook clamp load $F_H$) at the second side 66 of the plate to remove any remaining clearance or looseness between the hook and plate at the second side of the plate and resulting in a tight and secure engagement between the hook and anchor.

In the illustrated example, the hook 54 is pivotably mounted for rotation about a hook pivot axis 68. The hook pivot axis 68 is defined along the central axis of a hook pivot 70. In this example, the hook pivot 70 is in the form of a pin pressed into the bracket 58. The hook pivot 70 is non-rotating in this case, and an inner bearing surface of the hook 54 rotates about a static bearing surface of the pivot 70. The hook 54 has a closed position and an open position away from the closed position. In this case, the closed position is an angular position with respect to the hook pivot 70, defined where the latching mechanism 22 is in the engaged condition. The hook 54 is biased toward the closed position when the latching mechanism 22 is in the engaged condition.

In this example, the latching mechanism 22 includes a hook spring 72, illustrated in FIG. 4. FIG. 4 is a perspective view of the latching mechanism 22 of FIG. 3 from the opposite side of the mechanism. The particular spring 72 illustrated in FIG. 4 is a torsional spring with one end fixed at an end 74 of the hook pivot 70 that protrudes on the opposite side of the bracket 58 from the hook 54. The other end of the spring 72 engages a post 76 that is mounted to the hook 54 and protrudes through a clearance opening 75 in the bracket 58. The spring 72 is mounted on and supported by the end 74 of the hook pivot 70. The hook 54 is thus biased against the plate 48 at one side of the cutout 60 (i.e., in the clockwise direction of FIG. 3) when the mechanism 22 is in the engaged condition. In this example, the hook 54 is biased away toward the closed position (i.e., in the clockwise direction of FIG. 3) of the hook at all times, whether the locking mechanism 22 is in the engaged condition or not, with the biasing force increasing with increased movement away from the closed position. Other arrangements are possible for biasing the hook 54 in the desired direction, and non-rotary hooks are contemplated.

In the illustrated example, the cam 56 is pivotably mounted for rotation about a cam pivot axis 78. The cam pivot axis 78 is defined along the central axis of a cam pivot 80. In this example, the cam pivot 80 is in the form of a shouldered pin pressed into the bracket 58. The cam pivot 80 is non-rotating in this case, and an inner bearing surface of the cam 56 rotates about a static bearing surface of the pivot 80. The cam 56 has a closed position and an open position away from the closed position. In this case, the closed position is an angular position with respect to the cam pivot 80, defined where the latching mechanism 22 is in the engaged condition. The cam 56 is biased toward the closed position when the latching mechanism 22 is in the engaged condition as shown.

The latching mechanism 22 of FIG. 3 includes a cam spring 82, illustrated as a torsional spring in this example. One end of the spring 82 bears against a surface of the cam 56, and the other end of the cam spring 82 engages a post 84 that is mounted to the hook 54 and protrudes through an opening 86 in the cam 56. In one embodiment, the post 84 is an opposite end of the same piece that provides the biasing post 76 on the opposite side of the hook 54. The illustrated cam spring 82 thus applies forces to the cam 56 and the post 84 in opposite rotational directions in the engaged condition—i.e., the cam spring bears against the cam in a direction that tends to rotate the cam about the cam pivot axis in one direction, while it bears against the post in a direction that tends to rotate the post about the hook pivot axis in the opposite direction. The hook bias should be greater than the cam bias to ensure that the cam spring 82 moves that cam 56 rather than the hook 54. In this particular embodiment, the post 84 is also a cam guide that helps coordinate movement between the hook 54 and the cam 56 during certain portions of the movement of the hook toward and away from its closed positions. The role of the cam guide 84 in this coordinated movement is discussed further below in conjunction with FIGS. 6-11.

The cam spring 82 is mounted on and supported by an end of the cam pivot 80. The cam 56 is thus biased against the first side 64 of the plate 48 (i.e., in the clockwise direction of FIG. 3) when the mechanism 22 is in the engaged condition, thereby acting in a direction that tends to increase the clamp loads $F_C$ and $F_H$. Unlike the illustrated hook 54, the cam 56 is not biased toward its closed position (i.e., in the clockwise direction of FIG. 3) of the cam at all times (e.g., when not in the engaged condition). Other arrangements are possible for biasing the cam 56 in the desired direction, and non-rotary cams are contemplated.

Figure 5:
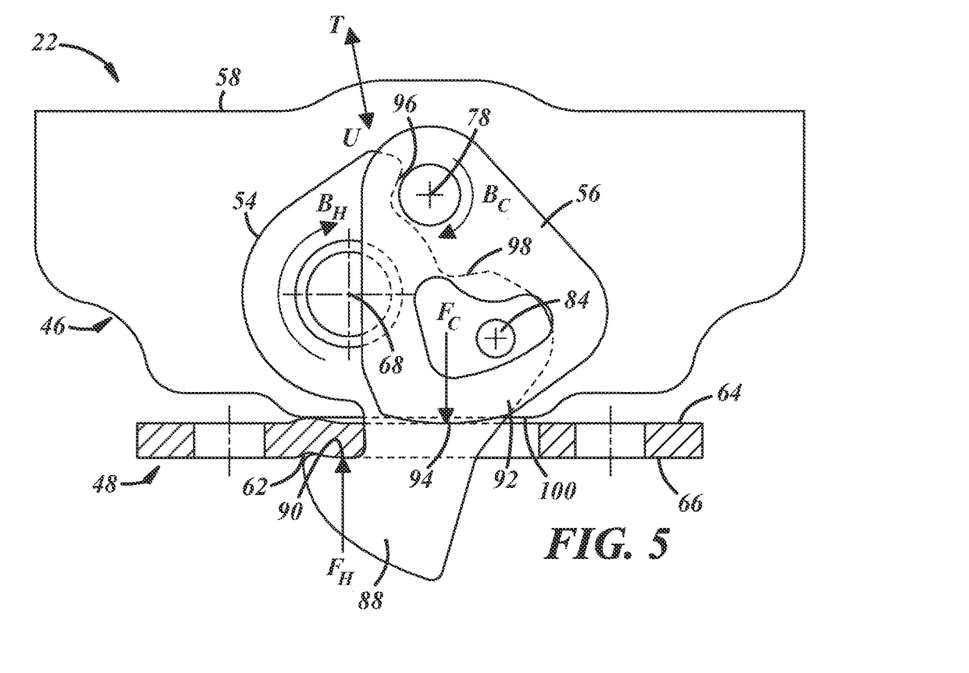
FIG. 5 is a cross-sectional view of the latching mechanism of FIG. 3 illustrated in an engaged condition with a hook and a cam in closed positions.

FIG. 5 is a cross-sectional side view of the latch mechanism 22 of FIG. 3 in the engaged condition. For simplicity in this view, the cam spring 82 is omitted in FIG. 5, and only an outline of the bracket 58 is shown. A double arrow indicates an exemplary direction of movement of the seat bottom between the illustrated use position (U) and a tilted position (T), for seat embodiments such at that in FIGS. 1 and 2. When attached to the occupant support, the latch assembly 46 may thus follow an arcuate path centered at the seat pivot axis when the latch mechanism is in the released condition and the occupant support is moving between the use position and the tilted position. The direction of the rotational bias $B_H$ of the hook 54 and the direction of the rotational bias $B_C$ of the cam 56 is also shown in FIG. 5.

The bias of the hook 54 ensures that an engagement portion 88 of the hook remains on the second side 66 of the plate 48. The hook 54 has a clamping surface 90 in contact with the second side 66 of the plate 48. In this example, the clamping surface 90 is complimentary in shape with the concave side of the dimple 62 in the plate 48 such that, with the clamp loads applied, rotation of the hook 54 against the bias of the spring hook is further prevented. The magnitude of the hook bias is a function of angular position of the hook 54 and the stiffness of the hook spring.

The bias of the cam 56 ensures that an engagement portion 92 of the cam presses against the anchor 48 from the first side 64 in the engaged condition. In this example, the cam 56 has a clamping surface 94 having a shape configured so that points on the clamping surface 94 vary in distance from the cam pivot axis 78 to cause the interference condition shown when the cam 56 is biased in the same rotational direction as the hook 54. The magnitude of the cam bias is a function of the location of the post 84 and the stiffness of the cam spring. The magnitude of the cam bias is thus a function of the angular position of the hook 54, since the position location of the post or cam guide 84 depends on the angular position of the hook.

Other features of the latching mechanism 22 illustrated in FIG. 5 include mechanical stops for limiting the range of movement of certain components. For instance, the hook 54 includes a first stop 96 that cooperates with the cam pivot 80 to limit movement of the hook in the direction of hook bias to a position just beyond the closed position. This stop 96 particularly comes into play when the latching mechanism 22 is in the released condition and spaced away from the anchor 48 to maintain the position of the hook for re-engagement with the anchor. The hook 54 also includes a second stop 98 that cooperates with the cam pivot 80 to limit movement of the hook in the opposite direction and define a fully open position for the hook. The bracket 58 may also provide a stop feature 100, such as a lower edge of the bracket as shown or a protrusion extending from the bracket. This stop 100 limits travel of the latch assembly 46 to a fixed amount (Z) (see FIG. 11) beyond its position in the engaged condition when moving in the direction of the use position (U) from the tilted position (T) and is discussed further below.

Figure 6:
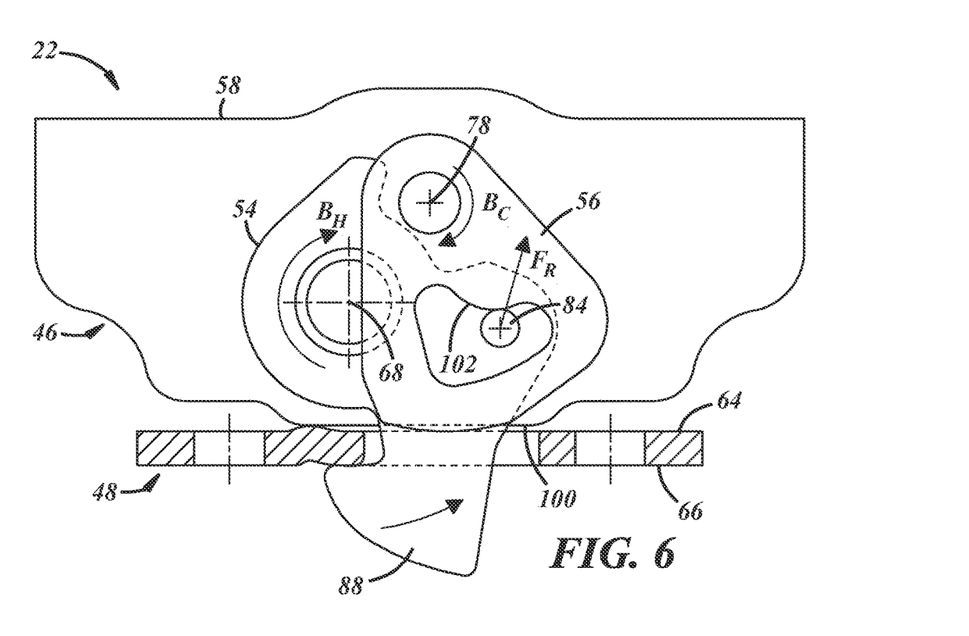
FIG. 6 is a cross-sectional view of the latching mechanism of FIG. 3 illustrated with the hook moved away from the closed position and the cam still in the closed position.

Reference is now made to FIGS. 6-11 to describe the illustrated latching mechanism in operation to releasably lock the latch assembly to the anchor and, thereby, the occupant support to the vehicle body. FIG. 6 illustrates the latching mechanism 22 changed away from the engaged condition of FIG. 5 with the hook 54 moved away from its closed position against the bias of the hook spring. This type of hook movement out of the engaged condition can be initiated manually by a user, by automated electric and/or electronic components of the seat or vehicle, or by some other seat or vehicle mechanism interacting with the latching mechanism 22. In one example, a releasing force $F_R$ is applied to a post mounted on the hook 54. In a particular example, the post 76 on the opposite side of the hook 54 (see FIG. 4) is configured for attachment to a cable or other actuating element. The cable can be routed to various locations on or around the vehicle seat and can be used to apply the releasing force when a user applies an associated forced to a lever, for example.

FIG. 6 particularly illustrates the hook 54 where the cam guide 84 first makes contact with a guide surface 102 of the cam 56 when moving away from its closed position. During hook 54 movement from the position of FIG. 5 to the position of FIG. 6, the magnitude of the hook bias increases, while the magnitude of the cam bias decreases. However, the cam 56 may remain in contact with the anchor 48 until the cam guide 84 contacts the guide surface 102 of the cam. While the cam guide 84 is in contact with the guide surface 102 of the cam 56, the hook 54 is considered to be in a guiding position in which the angular position of the cam is a function of and directly related to the angular position of the hook.

Figure 7:
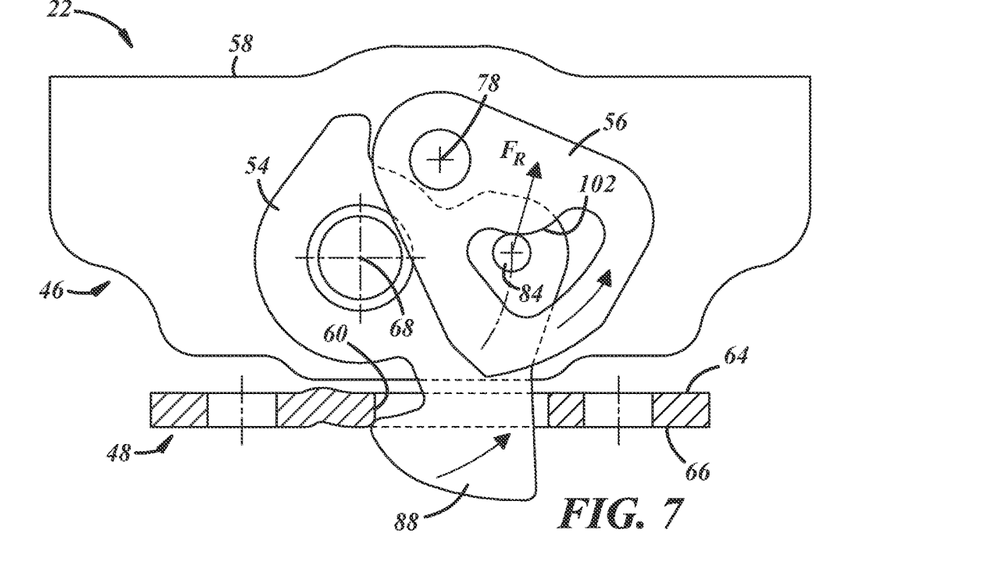
FIG. 7 is a cross-sectional view of the latching mechanism of FIG. 3 illustrated with the hook moved further away from the closed position than in FIG. 6.

FIG. 7 illustrates the latching mechanism 22 with the hook 54 moved further away from its closed position against the bias of the hook spring. This hook movement is continued movement beyond the position of FIG. 6 due to the application of the releasing force $F_R$. FIG. 7 particularly illustrates the hook 54 at a position just before the engagement portion 88 of the hook can pass through the cutout 60 in the plate 48. In one embodiment, the latch assembly 46 is biased in a direction away from the plate 48, such as by a biasing element acting on the occupant support, so that when the hook 54 reaches the illustrated position, the hook passes through the cutout and is released from the anchor. In other embodiments, a user manually applies a force to some portion of the vehicle seat to tilt it and thereby release the occupant support from the vehicle body while applying the releasing force required to move the hook to or beyond the illustrated position.

During hook 54 movement from the position of FIG. 6 to the position of FIG. 7, the magnitude of the hook bias increases. The magnitude of the cam bias during the same movement is not a factor because the hook 54 remains in a guiding position and governs movement of the cam 56 via interaction of the cam guide 84 and guide surface 102. During hook movement while the hook is in a guiding position, angular movement of the cam 56 about the cam pivot axis 78 is greater than the corresponding angular movement of the hook 54 about the hook pivot axis 68. This is due at least in part to the respective pivot axes 68, 78 being offset from each other. In the illustrated embodiment, the angular position of the cam 56 changes by an amount that is in a range from 2 to 2.5 times an amount that the angular position of the hook 54 changes while the hook is in the guiding position. This ratio is non-limiting and can be customized via the amount and/or direction of offset of the pivot axes 68, 78 and/or the shape of the guide surface 102. This type of relative cam and hook movement allows the cam 56 to release the clamping forces and move out of contact with the anchor 48 before the hook is in position to pass through the cutout 60 in the plate, thereby resulting in a lower required releasing force $F_R$.

Figure 8:
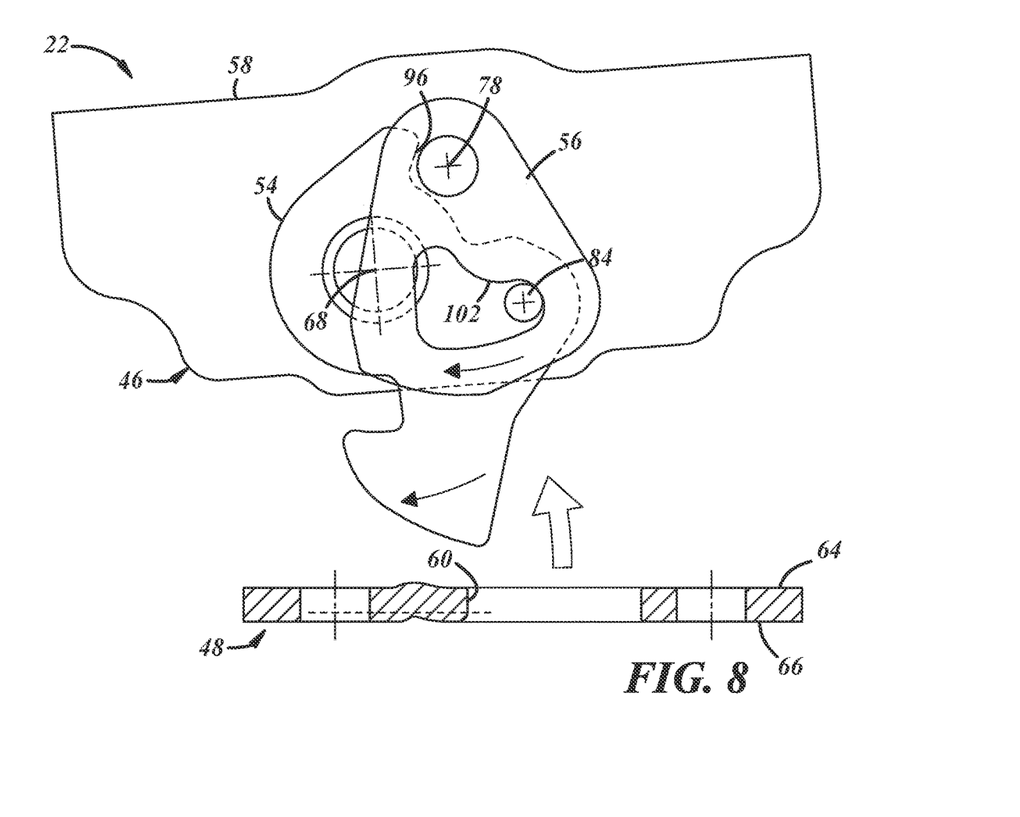
FIG. 8 is a cross-sectional view of the latching mechanism of FIG. 3 illustrated in a released condition.

FIG. 8 illustrates the latching mechanism 22 in the released condition after the hook 54 passes through the cutout 60 or is otherwise released from the anchor 48. The latch assembly 46 is not in contact with the anchor 48 when in the released condition. In the released condition, the hook bias causes the stop 96 of the hook 54 to be bear against the cam pivot 80. During hook 54 movement from the position of FIG. 7 to the position of FIG. 8, the magnitudes of the hook and cam biases decrease. The cam 56 moves back toward its closed position, with movement of the cam in that direction limited by the guide surface 102 of the cam.

Figure 9:
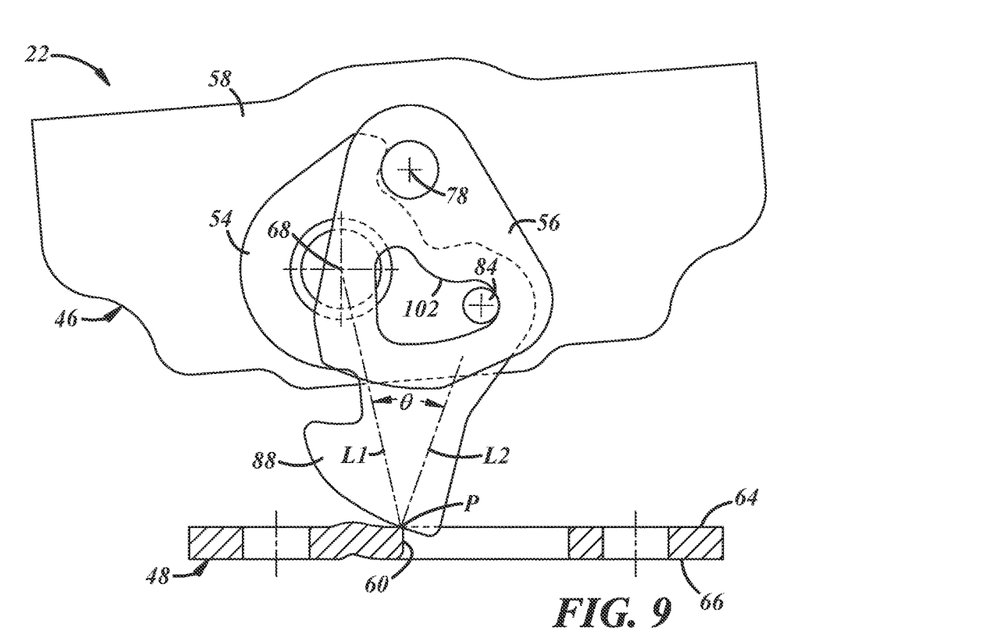
FIG. 9 is a cross-sectional view of the latching mechanism of FIG. 3 during a transition from the released condition of FIG. 8 to the engaged condition of FIG. 5.
Figure 10:
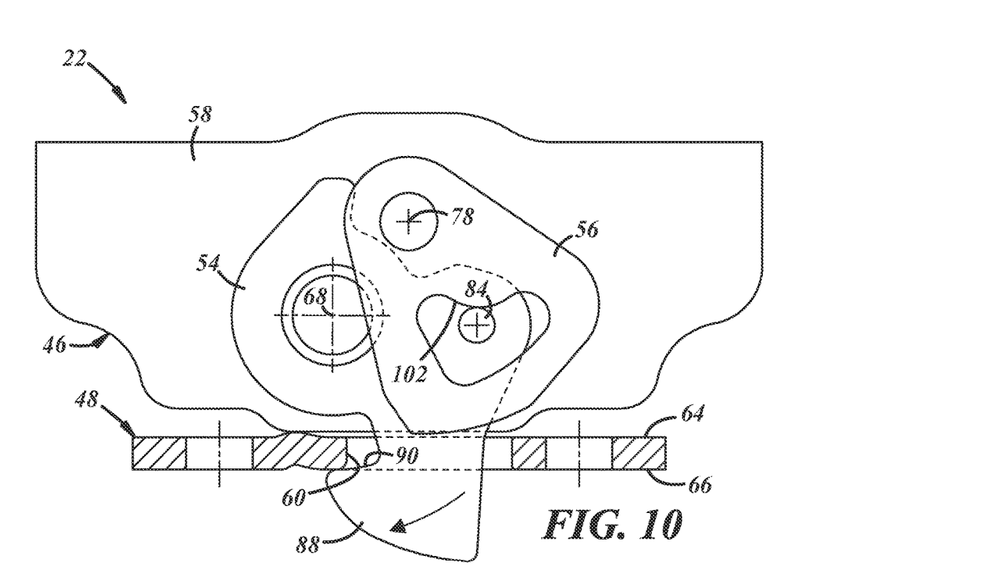
FIG. 10 is a cross-sectional view of the latching mechanism of FIG. 3 during the same transition of FIG. 9 illustrated with the hook moving toward the closed position of FIG. 5.
Figure 11:
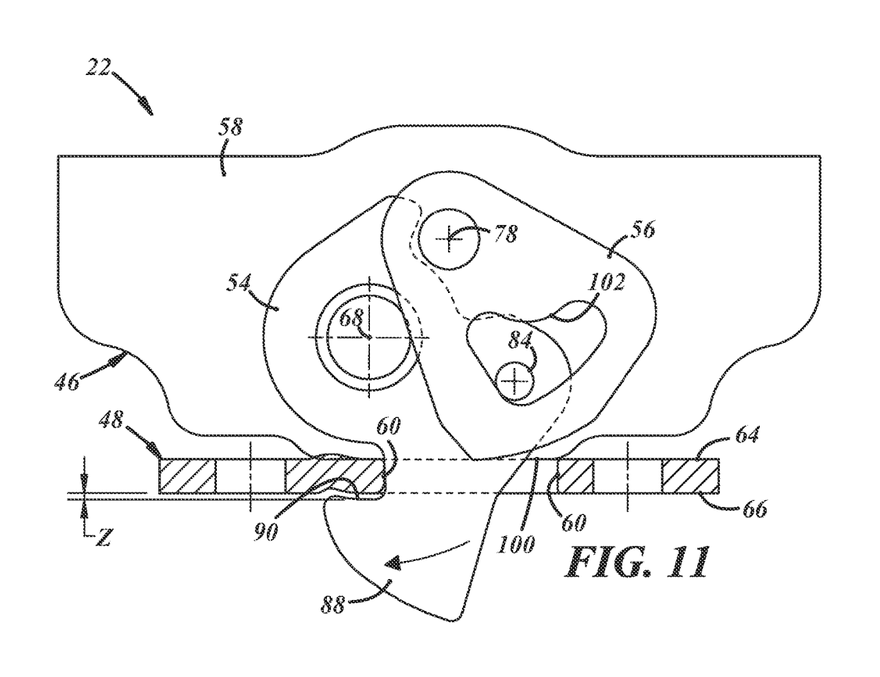
FIG. 11 is a cross-sectional view of the latching mechanism of FIG. 3 during the same transition of FIG. 10 illustrated with the hook in the closed position and before the latching mechanism reaches the engaged condition of FIG. 5.

FIGS. 9-11 show the illustrated latching mechanism during a transition from the released condition of FIG. 8 to the engaged condition of FIG. 5. In FIG. 9, the engagement portion 88 of the hook 54 is in contact with the first side 64 of the anchor 48, with the hook and cam 56 in the same position as in the released condition of the latching mechanism 22 in FIG. 8. A pressure or friction angle θ is defined where the hook 54 contacts the anchor 48, in this case at the edge of the cutout 60. The friction angle is measured between a line L1 extending between the contact point P and the hook pivot axis and a surface normal L2 of the hook at the contact point P. The friction angle should be sufficiently large to allow the hook 54 to slide along the contact point P during movement of the latch assembly 46 toward the anchor 48. In one embodiment, the friction angle is greater than 30 degrees. In another embodiment, the friction angle is in a range from 30 degrees to 35 degrees. Other angles are possible, although engagement effort must be balanced with other factors, such as the geometry of the hook, which may become impractical at excessively high friction angles.

In FIG. 10, at least most of the engagement portion 88 of the hook 54 is at the second side 66 of the anchor 48, with the clamping surface 90 of the hook in contact with the second side of the anchor. The hook 54 is again in the guiding position, similar to that of FIGS. 6 and 7. As noted above, while the hook 54 is in the guiding position, rotation of the cam 56 is multiplied with respect to rotation of the hook, due in part to the offset of the respective hook pivot and cam pivot axes. In addition, the guide surface 102 may be shaped to ensure that the cam 56 does not contact the anchor 48 at least until the engagement portion 88 of the hook 54 reaches the second side of the anchor 48. This allows the hook 54 to move toward the closed position and the engagement condition before any clamp load is applied by the cam 54.

In FIG. 11, the latching mechanism 22 is illustrated with the hook 54 in the closed position and with the positive mechanical stop 100, which is provided by the edge of the bracket 58 in this case, in contact with the first side 64 of the anchor 48. The latching mechanism 22 is not yet in the fully engaged condition here. Rather, the latch assembly 46 has reached its over-travel limit. As shown in FIG. 11, when the hook 54 reaches its closed position, the cam guide 84 moves out of contact with the guide surface 102 of the cam 56 because the first side 64 of the plate 48 limits rotation of the cam. This designed-in over-travel condition allows a user to press against on a portion of the seat when returning the occupant support to the use position so that the hook 54 easily re-engages with the clearance provided between the clamping surface of the hook and the second side 66 of the anchor 48. This condition will only occur when the latch assembly 46 is moved from the released condition to the engaged condition, as once the re-engagement force is removed, the clearance between the clamping surface of the hook and the second side 66 of the anchor 48 is taken up by the cam spring moving the cam 56 to its closed position, which is shown in FIG. 5, bringing the latching mechanism to the engaged condition. In the engaged condition of FIG. 5, any applied force that tends to move the latch assembly 46 toward the anchor 48 cannot cause such movement because of the clamp loads present at opposite sides of the anchor 48.

This is an improvement over other seat latching systems that rely on an elastomeric material (e.g., rubber) to compensate for the clearance necessary to allow a hook to fully engage. In such systems, a load applied to the seat bottom, such as by a seat occupant, can compress the elastomer and re-establish clearance between the hook and plate to cause a loose or rattling condition. Thus, in one embodiment, the latching mechanism described herein is absent a compressible element that is configured to hold the hook tightly against the anchor in the engaged condition. The above-described hook and cam latching mechanism is also an improvement over latching systems that rely on a secondary hook to engage the anchor. In such systems, the efforts required to engage and disengage the latching mechanism can be quite high and the packaging envelope of the systems can be quite large. Thus, in another embodiment, the latching mechanism described herein is absent a secondary hook that is configured to hold a primary hook tightly against the anchor in the engaged condition.

Figure 12:
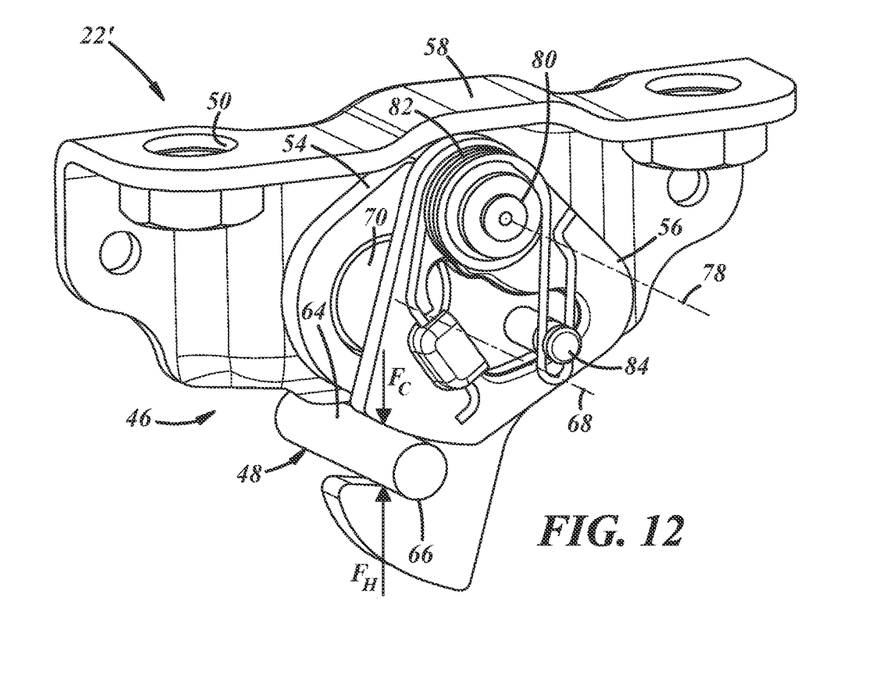
FIG. 12 is a perspective view of another example of the latching mechanism.

FIG. 12 illustrates an example of the latching mechanism 22' in which the anchor 48 is in the form of a post. In this example, the post 48 is cylindrical and may have a fixed position relative to the occupant support or the seat base or vehicle body. In other examples, the post 48 can be any elongate member having a central axis with one or both opposite ends fixed in position relative to the occupant support or the vehicle body. The central axis of the post 48 may be generally parallel with the hook pivot axis and/or the cam pivot axis, and the cross-sectional shape of the post may be round, oval, polygonal, or any other shape. The latching mechanism 22' is illustrated in the engaged condition, with the post 48 clamped between the hook 54 and the cam 56 with clamp loads FH and FC at respective opposite sides 66, 64 of the post. Operation of the illustrated latching mechanism 22' is very similar to that illustrated in FIGS. 5-11, and the individual components of the latching mechanism of FIG. 12 are indicated with the same reference numerals.

Figure 13:
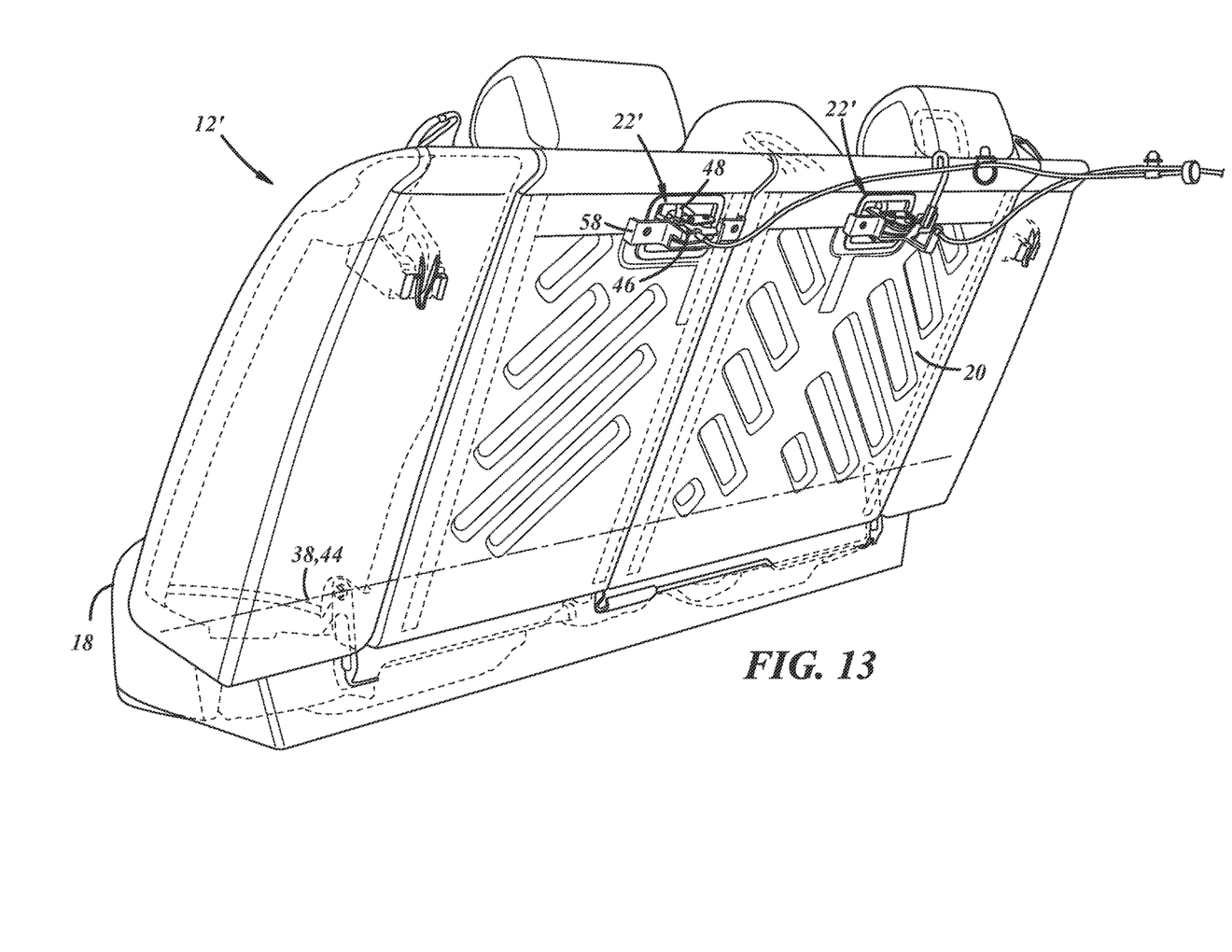
FIG. 13 is rear perspective view of an example of a vehicle seat that includes the latching mechanism on a seat back.

FIG. 13 is a rear perspective view of a fold-flat vehicle seat 12' equipped with the latching mechanism 22' of FIG. 12. In this example, two latching mechanisms 22' releasably couple the occupant support, seat back 20, to the vehicle body (not shown), which extends along the illustrated rearward side of the seat back when the seat back is in the illustrated use position. In this example, the latch assembly 46 is coupled with the vehicle body at a fixed position, and the anchor 48 is attached to the seat back 20 for movement with the seat back when the seat back is moved toward or away from the use position. The latching mechanisms 22' of FIG. 13 are illustrated in the engaged condition, and each has a bracket 58 for fixing the latch assembly 46 to the vehicle body. The seat back 20 is configured for pivotal movement about the seat pivot axis 38, which is the same as the seat back pivot axis 44 in this case, between the use position and the fold-flat position, along with any number of tilted positions in-between. The latching mechanism 22 of FIG. 3 with the anchor in the form of a plate could be employed with the vehicle seat 12' of FIG. 12, and/or the latch assembly 46 and anchor 48 could be reversed with respect to the component the each moves with. In other embodiments, both the seat bottom 18 and the seat back 20 are releasably coupled with the vehicle body by latching mechanisms as described herein.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle seat, comprising:
a seat base adapted for mounting to a vehicle body;
an occupant support supported by the seat base and having a use position;
a latching mechanism that releasably couples the occupant support to the vehicle body, the latching mechanism comprising a bracket, a hook having a clamping surface, a cam having a clamping surface, and an anchor, the hook and the cam each pivotally supported on the bracket and biased in the same rotational direction as each other by a hook spring and a cam spring, respectively, the hook spring having a first end coupled to the bracket and a second end coupled to the hook and the cam spring having a first end coupled to the hook spring and a second end coupled to the cam, the bracket coupled to one of the vehicle body and the occupant support, and the anchor coupled to the other of the vehicle body and the occupant support, the latching mechanism having an engaged condition, in which movement of the occupant support away from the use position is prevented, and a released condition, in which movement of the occupant support away from the use position is allowed,
wherein the clamping surface of the hook and the clamping surface of the cam are respectively in contact with opposite sides of the anchor and apply respective clamp loads in opposite directions to the opposite sides of the anchor so that the anchor is clamped between the clamping surfaces when the latching mechanism is in the engaged condition.

2. A vehicle seat as defined in claim 1, wherein the occupant support is configured for pivotal movement between the use position and a tilted position about a seat pivot axis when the latching mechanism is in the released condition.

3. A vehicle seat as defined in claim 1, wherein the hook and the cam are attached to the occupant support and move with the occupant support when the occupant support moves away from the use position, and the anchor is coupled with the vehicle body.

4. A vehicle seat as defined in claim 1, wherein the anchor is attached to the occupant support and moves with the occupant support when the occupant support moves away from the use position, and the hook and the cam are coupled with the vehicle body.

5. A vehicle seat as defined in claim 1, wherein the latching mechanism further comprises:
   a hook pivot, the hook being pivotably mounted to the hook pivot for movement toward and away from a closed position about a hook pivot axis, wherein the hook is at the closed position and biased toward the closed position when the latching mechanism is in the engaged condition; and
   a cam pivot, the cam being pivotably mounted to the cam pivot for movement toward and away from a closed position about a cam pivot axis, wherein the cam is at the closed position and biased toward the closed position when the latching mechanism is in the engaged condition.

6. A vehicle seat as defined in claim 5, wherein the hook pivot axis and the cam pivot axis are a fixed distance apart.

7. A vehicle seat as defined in claim 5, wherein the cam pivot axis is offset from the hook pivot axis.

8. A vehicle seat as defined in claim 5, wherein the cam pivot limits rotational movement of the hook about the hook pivot axis when the latching mechanism is in the released condition.

9. A vehicle seat as defined in claim 1, wherein an angular position of the cam is a function of an angular position of the hook and changes more than the angular position of the hook during movement of the hook toward and away from a closed position of the hook during a transition of the latching mechanism between the engaged condition and the released condition.

10. A vehicle seat as defined in claim 1, wherein the latching mechanism further comprises a cam guide that moves with the hook about a hook pivot axis during movement of the hook toward and away from a closed position, and the cam comprises a guide surface that engages the cam guide to define a position of the cam with respect to the hook during at least a portion of the movement of the hook toward and away from the closed position.

11. A vehicle seat as defined in claim 10, wherein the respective springs comprise a cam spring that applies forces to the cam and the cam guide in opposite rotational directions when the latching mechanism is in the engaged condition.

12. A vehicle seat as defined in claim 11, wherein respective springs comprise a hook spring that biases the hook in the same rotational direction as the cam, the hook spring applying a spring force at the cam guide that is higher than the spring force applied to the cam guide by the cam spring.

13. A vehicle seat as defined in claim 1, wherein the anchor is a plate having a cutout formed through the thickness of the plate, the hook extending from one of the opposite sides of the plate, through the cutout, to the other side of the plate when the latching mechanism is in the engaged condition.

14. A vehicle seat as defined in claim 1, wherein the anchor is a post.

15. A vehicle seat as defined in claim 1, wherein the latching mechanism is configured so that, during a transition from the released condition, in which the clamping surface of the hook is located on one of the opposite sides of the anchor, to the engaged condition, the hook moves away from a closed position while in contact with the anchor, then moves toward the closed position when the clamping surface of the hook reaches the other side of the anchor, and
   wherein the cam does not contact the anchor during the transition until the hook is in the closed position.

16. A vehicle seat as defined in claim 15, wherein the latching mechanism further comprises a cam guide mounted to the hook, the cam further comprising a guide surface and the hook being biased toward the closed position while in contact with the anchor, and
   wherein the cam guide and the guide surface are engaged during a portion of the transition so that cam movement is a function of hook movement, the guide surface being shaped to prevent the cam from contacting the anchor during said portion of the transition.

17. A vehicle seat as defined in claim 15, wherein the cam guide and guide surface are disengaged when the hook is in the closed position.

18. A vehicle seat as defined in claim 1, wherein the latching mechanism further comprises a cam spring that biases the cam toward a closed position to provide at least a portion of the clamp load applied to the anchor by the cam when the latching mechanism is in the engaged condition.

19. A vehicle seat as defined in claim 1, wherein the occupant support is a seat bottom and the seat base comprises seat rails that accommodate sliding movement of the seat bottom with respect to the vehicle body, the anchor being attached to one of the seat rails, and the hook and the cam being attached to the seat bottom.

20. A vehicle seat as defined in claim 1, wherein the occupant support is a seat back, the anchor being attached to the seat back, and the hook and the cam being coupled to the vehicle body at a fixed position relative to the vehicle body.

21. A vehicle seat as defined in claim 1, wherein, when the latching mechanism is in the engaged condition, the hook prevents movement of the occupant support away from the use position and the cam is biased in a direction that increases the respective clamp loads.

22. A vehicle seat as defined in claim 1, wherein the occupant support is configured for pivotal movement between the use position and a tilted position about a seat pivot axis located at a first end of the occupant support, the latching mechanism being located at a second end of the occupant support.

23. A vehicle seat as defined in claim 22, wherein the vehicle seat is an easy-entry vehicle seat and the occupant support is a seat bottom, the first end of the seat bottom being a forward end and the second end of the seat bottom being a rearward end.

24. A vehicle seat as defined in claim 22, wherein the vehicle seat is a fold-flat vehicle seat and the occupant support is a seat back, the first end of the seat back being a lower end and the second end of the seat back being an upper end.

* * * * *